(12) United States Patent
Zheng et al.

(10) Patent No.: US 9,344,663 B2
(45) Date of Patent: May 17, 2016

(54) SENSING METHOD ON SENSING DEVICE BY SMART TERMINAL AND SMART TERMINAL USING THE SAME

(71) Applicant: MStar Semiconductor, Inc., Hsinchu Hsien (TW)

(72) Inventors: Renzhen Zheng, Shenzhen (CN); Jianqun Jiang, Shenzhen (CN)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 330 days.

(21) Appl. No.: 13/958,046

(22) Filed: Aug. 2, 2013

(65) Prior Publication Data

US 2014/0036158 A1   Feb. 6, 2014

(30) Foreign Application Priority Data

Aug. 2, 2012   (CN) .......................... 2012 1 0273268

(51) Int. Cl.
*H04N 5/44* (2011.01)
*H04N 21/41* (2011.01)
*H04N 21/422* (2011.01)

(52) U.S. Cl.
CPC ......... *H04N 5/4403* (2013.01); *H04N 21/4126* (2013.01); *H04N 21/42222* (2013.01); *H04N 2005/4407* (2013.01); *H04N 2005/4428* (2013.01)

(58) Field of Classification Search
CPC .................... H04N 5/4403; H04N 2005/4407; H04N 2005/4428; H04N 21/4126; H04N 21/42222
See application file for complete search history.

(56) References Cited

FOREIGN PATENT DOCUMENTS

EP   2458907 A2   5/2012

OTHER PUBLICATIONS

Quadeer A. Ahmed, "Computer-implemented Functional Claim Limitations—How Much Corresponding Structure Needs to be Disclosed?" Intellectual Property Today Jul. 2013 p. 31-34.*

* cited by examiner

*Primary Examiner* — Brian Zimmerman
*Assistant Examiner* — Sara Samson
(74) *Attorney, Agent, or Firm* — WPAT, PC; Justin King (57) ABSTRACT

A sensing method for a smart terminal to interact with a sensing device in a remote control device is provided. The sensing method includes following steps. The first step is that the smart terminal obtains a current sensing device usage information. The second step is according to the current sensing device usage information and the previous sensing device usage information pre-stored in the smart terminal, the smart terminal determines whether a change occurs in a sensing device usage situation. When the change occurs in the sensing device usage situation, the remote control device associated with the smart terminal and carrying a plurality of sensing devices is notified.

6 Claims, 7 Drawing Sheets

SENSING METHOD ON SENSING DEVICE BY SMART TERMINAL AND SMART TERMINAL USING THE SAME

This application claims the benefit of People's Republic of China application Serial No. 201210273268.3, filed on Aug. 2, 2012, the subject matter of which is incorporated herein by reference.

BACKGROUND OF THE INVENTION

1. Field of the Invention

The invention relates in general to a computer technical field, and more particularly to a sensing method for a smart terminal to interact with a sensing device in a remote control device and a smart terminal using the same.

2. Description of the Related Art

With its rapid developments, the Android system, an open operating system based on a Linux core and serving as a mobile phone operating platform, is also being used more and more by other hardware terminals, e.g., televisions and digital set-up boxes, which are referred to as Android smart terminals. Meanwhile, through sensing devices such as gravity sensors and optical sensors, many Android applications offer enriched input methods and control methods.

An original Android system implemented in a mobile phone usually operates in an integral environment with the mobile phone which includes various sensing devices, so that power consumption of the sensing devices involved is easily controlled. However, under considerations of costs and operational convenience, manufacturers of Android smart terminals (e.g., televisions and set-up boxes) do not dispose the sensing devices at the smart terminal; the sensing devices are disposed at a corresponding remote control device (e.g., an infrared remote controller or a cell phone remote controller) instead. The remote control device equipped with the sensing devices is referred to as a sensing remote control device.

Conventionally, a sensing remote control device performs a sensing operation on the sensing devices by two methods. In the first method, a user determines whether to activate the sensing function of a certain sensing device by sending a command to a corresponding smart terminal (e.g., a television). A user needs to be informed of whether a currently used application carries a sensing operation on a sensing device, which will put additional burden on the user. In the other method, no manual activation is implemented and sensing information of the sensing devices in the remote control device is constantly being collected, causing unnecessary consumption of power and occupation of resources in the remote control device.

SUMMARY OF THE INVENTION

The disclosure is directed to a sensing method for a smart terminal to interact with a sensing device in a remote control device and a smart terminal using the same. The sensing method is provided to prevent unnecessary consumption of power and occupation of resources caused by frequent collection and transmission of sensing data from sensing devices, while also to eliminate inconveniences created by manually activating and deactivating the sensing remote controller by a user.

According to one aspect of the disclosure, a sensing method for a smart terminal to interact with a sensing device in a remote control device is provided. The remote control device is associated with the smart terminal and carries a plurality of sensing devices. The sensing method comprises following steps. A first step is that the smart terminal obtains a current sensing device usage information, which comprises an identity of a current application and a type of the sensing device currently applied by the current application. A current application is defined as an application currently opened on the smart terminal and also currently being used by the user. A second step is, according to the current sensing device usage information and a previous sensing device usage information pre-stored in the smart terminal, the smart terminal determines whether a change occurs in the sensing device usage situation. A third step is, when the change occurs in a sensing device usage situation, a notification is transmitted to the remote control device, so that the remote control device takes control of the sensing device currently applied by the current application.

According to another aspect of the disclosure, a smart terminal is provided. The smart terminal comprises: an information obtaining module, for obtaining a current sensing device usage information, which comprises an identity of a current application and a type of the sensing device currently applied by the current application; a determining module, for determining whether a change occurs in a sensing device usage situation is according to the current sensing device usage information and the previous sensing device usage information pre-stored in the smart terminal; and a transmitting module, for transmitting a notification to a remote control device. The remote control device is associated with the smart terminal and carries a plurality of sensing devices.

Therefore, according to the disclosure, by comparing a current sensing device usage information and a previous sensing device usage information pre-stored in the smart terminal, it is determined whether a change occurs in a sensing device usage situation, and a notification of the sensing device usage situation change is transmitted to the sensing remote control device. The sensing remote control device then activates the corresponding sensing device in the sensing remote control device and deactivates other previously activated sensing devices no longer in use, thereby smartly controlling the sensing devices through the sensing remote control device.

The above and other aspects of the disclosure will become better understood with regard to the following detailed description of the preferred but non-limiting embodiments. The following description is made with reference to the accompanying drawings.

DETAILED DESCRIPTION OF THE INVENTION

Figure 1:
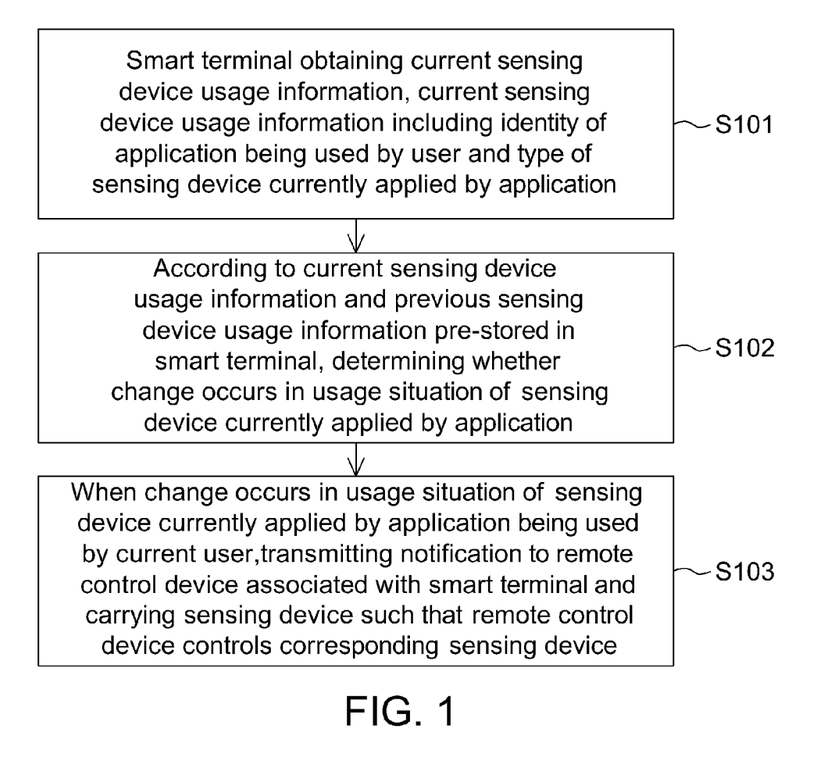
FIG. 1 is a flowchart of a sensing method for a smart terminal to interact with a sensing device in a remote control device according to one embodiment of the disclosure.

FIG. 1 shows a flowchart of a sensing method for a smart terminal to interact with a sensing device in a remote control device according to one embodiment of the disclosure. The sensing method comprises the following steps.

In a first step S101, the smart terminal obtains a sensing device usage information currently applied, which is referred to as a current sensing device usage information. The current sensing device usage information comprises an identity of a current application and a type of the sensing device currently applied by the current application. A current application is defined as an application currently opened on the smart terminal and also currently being used by the user. For example, the smart terminal may be a smart digital television, a computer or a smart set-up box; the sensing device may be a gravity sensor, an acceleration sensor, a gyroscope, an electronic compass, or a light distance sensor.

Figure 5:
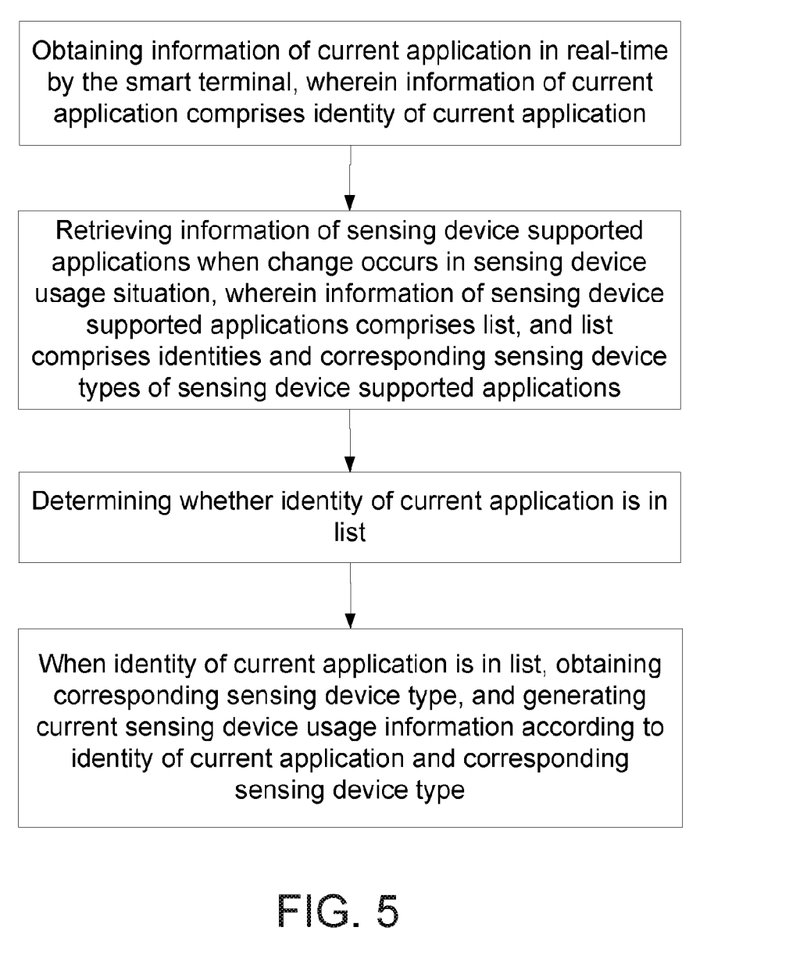
FIG. 5 is a flowchart of a step S101 of a sensing method for a smart terminal to interact with a sensing device in a remote control device according to one embodiment of the disclosure.

In one embodiment, Step S101 comprises Step A to Step D. FIG. 5 shows a flowchart of step S101. In Step A, the smart TV obtains the information of the current application in real-time, which comprises the identity of the current application. Step B, when the change occurs in a sensing device usage situation, an information of sensing device supported applications is retrieved. The information of sensing device supported applications comprises a list, and the list further comprises identities and corresponding sensing device types of sensing devices supported applications. In Step C, according to the identity of the current application and the list, it is determined whether the identity of the application is in the list. In Step D, when the identity of the current application is in the list, the corresponding sensing device type is obtained, and the current sensing device usage information is generated according to the identity and the sensing device type of the current application. When the identity of the current application is in the list, the type of the sensing device currently applied by the current application can be obtained according to the identity of the current application. When the identity of the current application is not in the list, it means that the current application does not apply any sensing device.

Figure 6:
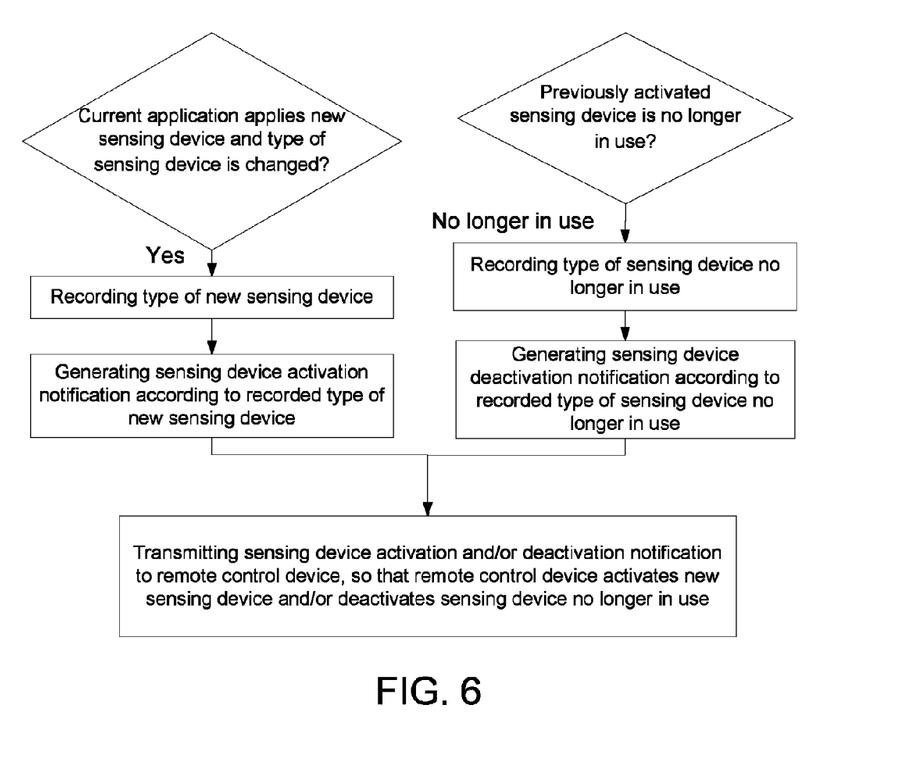
FIG. 6 is a flowchart of a step S102 and a step S103 of a sensing method for a smart terminal to interact with a sensing device in a remote control device according to one embodiment of the disclosure.

FIG. 6 shows a flowchart of step S102 and step S103 according to one embodiment of the disclosure. In a second step S102, according to the current sensing device usage information and the previous sensing device usage information pre-stored in the smart terminal, it is determined whether a change occurs in the sensing device usage situation.

In one embodiment, Step S102 includes the following steps as shown in FIG. 6. In Step S102A, according to the current sensing device usage information and the previous sensing device usage information pre-stored in the smart terminal, it is determined whether the current application uses a new sensing device and whether the type of the sensing device is changed. In Step S102B, according to the current sensing device usage information and the previous sensing device usage information pre-stored in the smart terminal, it is determined whether the previously activated sensing device is no longer in use. It should be noted that a sequence for performing Step S102A and Step S102B is not limited.

After Step S102A, when it is determined that the current application applies a new sensing device or the type of the sensing device applied by the current application is changed, the type of the new sensing device is recorded.

After Step S102B, when it is determined that the previously activated sensing device is no longer in use, the type of the sensing device no longer in use is recorded.

When the type of the sensing device applied by the current application is changed, it means that the sensing device is no longer in use or the type of the sensing device applied is changed.

In Step S103 as shown in FIG. 6, when the change occurs in the sensing device usage situation, a notification is transmitted to a remote control device, so that the remote control device takes control of the corresponding sensing device. The remote control device is associated with the smart terminal and carries a plurality of sensing devices.

For example, the remote control device includes an infrared remote controller, a cell phone and a personal digital assistant (PDA).

According to the determination results, it is confirmed that a change occurs in the sensing device usage situation. According to contents of the change, an activation and/or deactivation notification is transmitted to the remote control device associated with the smart TV and carrying the plurality of sensing devices, thereby achieving smart control of activating and deactivating the sensing devices.

In one embodiment, Step S103 includes the following steps. In Step S103A, a sensing device activation notification is generated according to the recorded type of the new sensing device. In Step S103B, a sensing device deactivation notification is generated according to the recorded type of the sensing device no longer in use. In Step S103C, via a wired or wireless method, the sensing device activation and/or deactivation notification is transmitted to the remote control device, so that the remote control device takes control of the corresponding sensing devices.

For example, a transmission mode for the sensing device activation/deactivation notification includes wired and wireless modes, such as RJ45, RS232, WiFi, Bluetooth, Zigbee, infrared and 3 G.

After receiving the notification, the remote control device performs a corresponding operation, activates the corresponding sensing device in the remote control device, or deactivates the previously activated sensing device no longer in use.

After Step S103, the previous sensing device usage information is replaced with the current sensing device usage information and the current sensing device usage information is stored to a predetermined address for a next access.

As described in the above embodiment, the smart terminal of the disclosure first obtains the current sensing device usage information, and determines whether a change occurs in the sensing device usage situation according to the current sensing device usage information and the previous sensing device usage information pre-stored at the local end. When a change occurs in the sensing device usage situation, a notification is transmitted to the remote control device. Thus, the sensing device can be smartly controlled via the sensing remote control device to simplify user operations as well as preventing unnecessary consumption of power and occupation of resources in the remote control device created by frequent collection and transmission of sensing data.

In summary, the disclosure reduces power consumption of the remote control device and the transmission bandwidth as well as manual activation and deactivation operations by the user, achieving a simplified operational approach.

Figure 2:
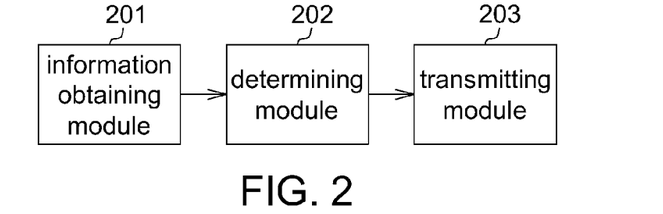
FIG. 2 is a schematic diagram of a smart terminal according to one embodiment of the disclosure.

FIG. 2 shows a schematic diagram of a smart terminal according to one embodiment of the disclosure. The smart terminal comprises an information obtaining module 201, a determining module 202 and a transmitting module 203.

The information obtaining module 201 obtains a current sensing device usage information. The current sensing device usage information comprises an identity of a current application and a type of a sensing device currently applied by the current application. A current application is defined as an application currently opened on the smart terminal and also currently being used by a user The current application can be identified via the identity, and the type of the sensing device currently applied by the current application can be confirmed via the type of the sensing device.

Figure 7:
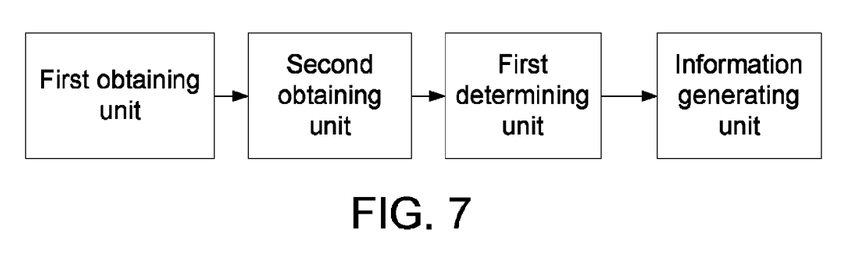
FIG. 7 is a schematic diagram of an information obtaining module 201 in a smart terminal according to one embodiment of the disclosure.

In one embodiment, referring to FIG. 7, the information obtaining module 201 further comprises a first obtaining unit, a second obtaining unit, a first determining unit and an information generating unit.

The first obtaining unit obtains the information of the current application in real-time. The information of the current application includes the identity of the current application.

The second obtaining unit retrieves an information of sensing device supported applications when a change occurs in the sensing device usage situation. The information of sensing device supported applications comprises a list, and the list includes the identities and corresponding sensing device types of sensing device support applications.

The first determining module, according to the identity of the current application and the list of the application currently applying the sensing device, determines whether the identity of the current application is in the list.

When the identity of the application being used by the current user is in the list, the information generating unit obtains the corresponding sensing device type, and generates the current sensing device usage information according to the identity of the current application and the corresponding sensing device type.

When the identity of the current application is in the list, the type of the sensing device applied by the current application can be confirmed according to the identity of the current application. When the identity of the current application is not in the list, it means that the current application does not apply any sensing device.

Figure 8:
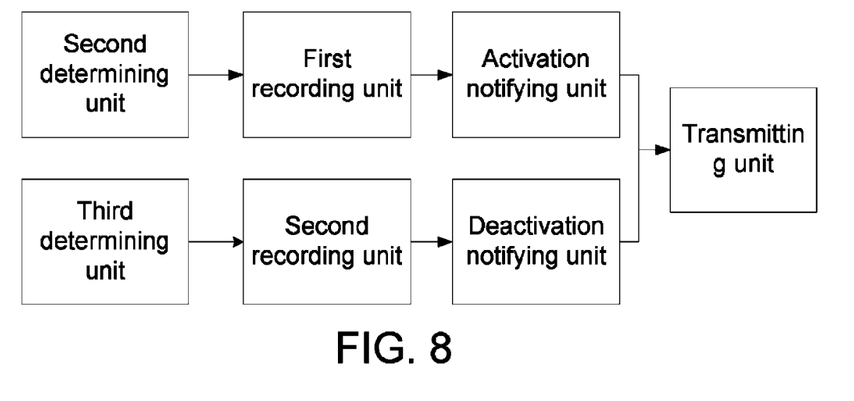
FIG. 8 is a schematic diagram of a determining module 202 and a transmitting module 203 in a smart terminal according to one embodiment of the disclosure.

FIG. 8 is a schematic diagram of the determining module 202 and the transmitting module 203 according to one embodiment of the disclosure. The determining module 202, according to the current sensing device usage information and the previous sensing device usage information pre-stored in the smart terminal, determines whether a change occurs in the sensing device usage situation of the sensing device currently applied by the current application.

The determining module 202 as shown in FIG. 8 comprises a second determining unit, a third determining unit, a first recording unit and a second recording unit.

The second determining unit, according to the current sensing device usage information and the previous sensing device usage information pre-stored in the smart terminal, determines whether the current application applies a new sensing device and whether the type of the sensing device applied is changed.

The third determining unit, according to the current sensing device usage information and the previous sensing device usage information pre-stored in the smart terminal, determines whether the previously activated sensing device is no longer in use.

When it is determined that the current application applies a new sensing device or when the type of the sensing device applied by the current application is changed, the first recording unit records the type of the new sensing device.

When it is determined that the previously activated sensing device is no longer in use, the second recording unit records the type of the sensing device that is no longer in use.

When the type of the sensing device applied by the current application is changed, it means that the sensing device is no longer in use or the type of the sensing device applied is changed.

The transmitting module 203 transmits a notification to the remote control device when a change occurs in the sensing device usage situation applied by the current application, so that the remote control device takes control of the corresponding sensing device.

According to the determination results, it is confirmed that a change occurs in the usage situation of the sensing device currently applied by the current application. According to contents of the change, an activation and/or deactivation notification is transmitted to the remote control device, thereby achieving smart control of activating and deactivating the sensing devices.

The transmitting module 203 as shown in FIG. 8 comprises an activation notifying unit, a deactivation notifying unit and a transmitting unit.

The activation notifying unit generates a sensing device activation notification according to the recorded type of the new sensing device. The deactivation notifying unit generates a sensing device deactivation notification according to the recorded type of the sensing device that is no longer used. The transmitting unit, via a wired or wireless method, transmits the sensing device activation and/or deactivation notification to the remote control device, so that the remote control device takes control of the corresponding sensing devices.

In one embodiment, the smart terminal further comprises a replacing module. The replacing module replaces the previous sensing device usage information with the current sensing device usage information, and stores the current sensing device usage information to a predetermined address for a next access.

Figure 3:
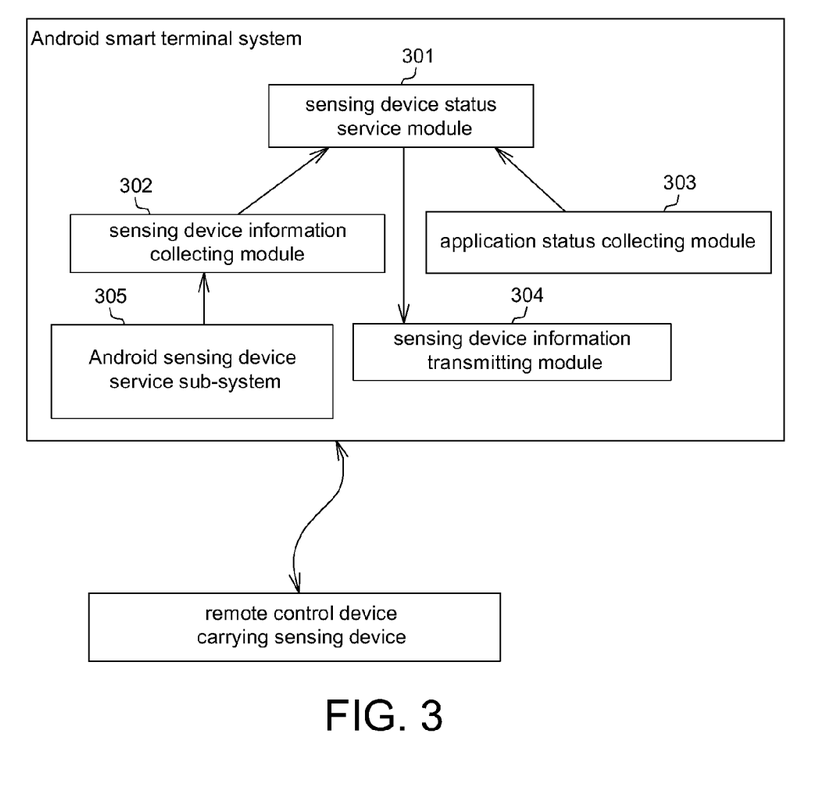
FIG. 3 is a schematic diagram of a system structure of a smart terminal according to one embodiment of the disclosure.
Figure 4:
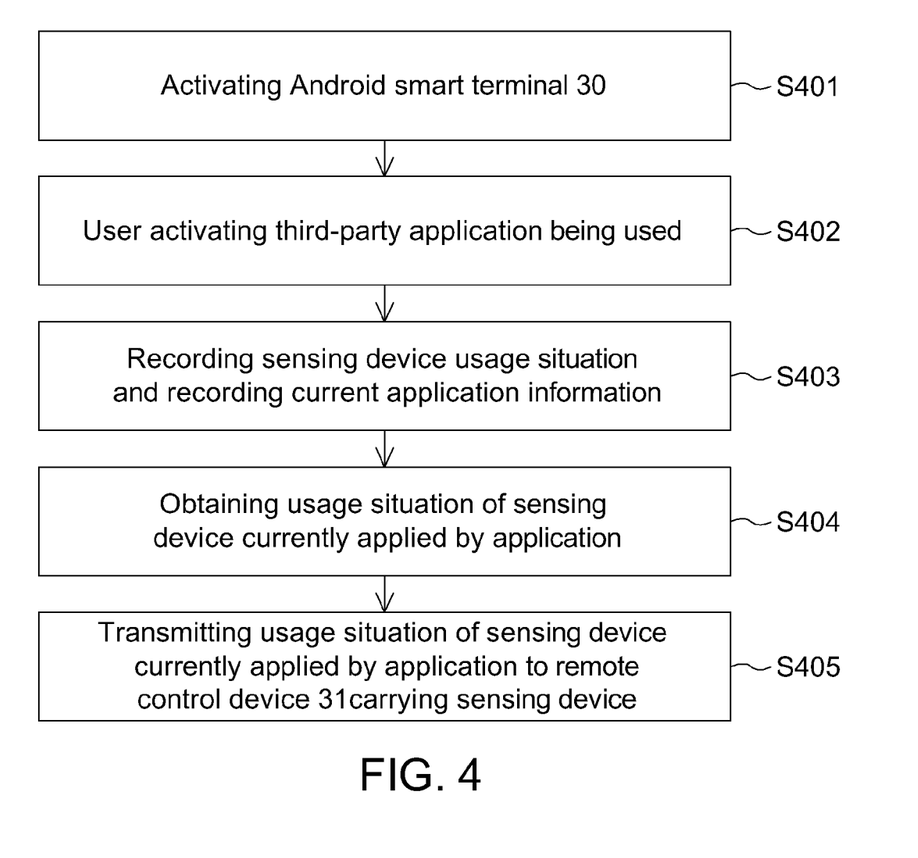
FIG. 4 is a flowchart of FIG. 3.

FIG. 3 shows a schematic diagram of a system structure of a smart terminal according to one embodiment of the disclosure; FIG. 4 shows a flowchart of FIG. 3. Taking an Android operating system as the system for example, the system structure includes an Android smart terminal system 30 and a remote control device 31 carrying a sensing device. The Android operating system 30 comprises a sensing device status service module 301, a sensing device information collecting module 302, an application status collecting module 303, a sensing device information transmitting module 304, and an Android sensing device service sub-system 305.

The Android smart terminal system 30 is installed with the sensing device status service module 301. The sensing device status service module 301 compares and retrieves corresponding application identity information in the sensing device information collecting module 302 and the application status collecting module 303, and compares the retrieved information with a previous status to determine whether a result is to be updated. When an update is needed, the updated result is transmitted to the remote control device 31 carrying the sensing device via the sensing device information transmitting module 304.

The modules in the foregoing Android smart terminal system 30 are described in detail below.

The sensing device status service module 301 controls logics of the modules in a centralized manner, records the status of remote control device 31 when the sensing device was previously updated, compares the previous result, and transmits the previous result if updated to the remote control device 31 via the sensing device information transmitting module 304. The sensing device status service module 301 corresponds to the comparing module 203 and the transmitting module 204 of a device in the smart terminal operating system performing sensing on the sensing devices.

The sensing device information collecting module 302 provides a binder service in the Android system, and collects the type of the sensing device and the current application identity reported by the Android sensing device service subsystem 305. The sensing device information collecting module 302 corresponds to the second collecting module of the device in the smart terminal operating system performing sensing on the sensing devices.

The application status collecting module 303 obtains the program identity (PID) of the current application via a "RunningAppProcessInfor.importance" interface in Android Framework. The application status collecting module 303 corresponds to the first collecting module of the device in the smart terminal operating system performing sensing on the sensing devices.

The sensing device information transmitting module 304, according to different connections of the remote control device 31, adopts different physical channels and transmission methods to transmit the sensing device status information to the remote control device 31 carrying the sensing device. The sensing device information transmitting module 304 corresponds to the transmitting module of the device in the smart terminal operating system performing sensing on the sensing devices.

The Android sensing device service sub-system 305, by retrieving "sensing deviceService" in Android Framwork, reports associated information to the sensing device information collecting module 302 when an application starts applying or stops applying the sensing device.

Referring FIG. 4, operation details of the above Android smart terminal system 30 in an actual application includes the following steps.

In Step S401, the Android smart terminal system 30 is activated.

In Step S402, a user activates a third-party application being used. That is, the third-party application being used includes all applications in operation and also includes the application that is in operation and being used by the user.

In Step S403, the sensing device information collecting module 302 records the sensing device usage situation, and the application status collecting module 303 records the current application information, i.e., information of the operating application being used by the user.

In Step S404, the information in Step S403 is compared and analyzed to obtain the sensing device usage situation currently applied by the application.

In Step S405, the sensing device information transmitting module 304 transmits the usage situation of the sensing device currently applied by the current application to the remote control device 31.

As explained with the above description, it is determined whether a change occurs in the usage situation of the sensing device applied by the current application according to the current sensing device usage information and the previous sensing device usage information pre-stored at the local end. When a change occurs in the usage situation of the sensing device applied by the current application, an activation and/or deactivation notification is transmitted to the remote control device. Thus, the sensing devices can be smartly controlled to simplify user operations as well as preventing unnecessary consumption of power and occupation of resources by frequent collection and transmission of sensing data.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sensing method for a smart terminal to interact with a sensing device in a remote control device, comprising:
   (A), obtaining a current sensing device usage information by the smart terminal, wherein the current sensing device usage information comprises an identity of a current application and a type of a sensing device currently applied by the current application, wherein the current application is defined as an application opened on the smart terminal and also currently being used by a user;
   (B), determining whether a change occurs in a sensing device usage situation according to the current sensing device usage information and a previous sensing device usage information pre-stored at the smart terminal; and
   (C), transmitting a notification to the remote control device when the change occurs in the sensing device usage situation, so that the remote control device takes control of the sensing device currently applied by the current application.

2. The sensing method according to claim 1, wherein the step (A) further comprises:
   obtaining an information of the current application in real-time by the smart terminal, wherein the information of the current application comprises the identity of the current application;
   retrieving an information of sensing device supported applications when the change occurs in the sensing device usage situation, wherein the information of sensing device supported applications comprises a list, and the list comprises identities and corresponding sensing device types of sensing device supported applications;
   determining whether the identity of the current application is in the list; and
   when the identity of the current application is in the list, obtaining the corresponding sensing device type, and generating the current sensing device usage information according to the identity of the current application and the corresponding sensing device type.

3. The sensing method according to claim 1, wherein the step (B) further comprises:
   according to the current sensing device usage information and the previous sensing device usage information pre-stored at the smart terminal, determining whether the current application applies a new sensing device and whether the type of the sensing device is changed; and
   according to the current sensing device usage information and the previous sensing device usage information pre-stored at the smart terminal, determining whether the previously activated sensing device is no longer in use.

4. The sensing method according to claim 3, further comprising:
   when it is determined that the current application applies the new sensing device or when the type of the sensing device is changed, recording the type of the new sensing device; and
   when it is determined that the previously activated sensing device is no longer in use, recording the type of the sensing device no longer in use.

5. The sensing method according to claim 4, wherein the step (C) further comprises:
- generating a sensing device activation notification according to the recorded type of the new sensing device;
- generating a sensing device deactivation notification according to the recorded type of the sensing device no longer in use; and
- transmitting the sensing device activation and/or deactivation notification to the remote control device, so that the remote control device activates the news sensing device and/or deactivates the sensing device no longer in use.

6. The sensing method according to claim 1, further comprising:
- replacing the previous sensing device usage information by the current sensing device usage information, and storing the current sensing device usage information to a predetermined address.

* * * * *